(12) United States Patent
Houss

(10) Patent No.: US 9,643,533 B1
(45) Date of Patent: May 9, 2017

(54) SIGNAL U-TURN

(71) Applicant: Max Houss, Riviera Beach, FL (US)

(72) Inventor: Max Houss, Riviera Beach, FL (US)

( * ) Notice: Subject to any disclaimer, the term of this patent is extended or adjusted under 35 U.S.C. 154(b) by 0 days.

(21) Appl. No.: 15/004,458

(22) Filed: Jan. 22, 2016

Related U.S. Application Data

(60) Provisional application No. 62/260,034, filed on Nov. 25, 2015.

(51) Int. Cl.
*B60Q 1/14* (2006.01)
*B60Q 1/34* (2006.01)
*B60Q 1/00* (2006.01)
*H05B 33/08* (2006.01)

(52) U.S. Cl.
CPC ........... *B60Q 1/343* (2013.01); *B60Q 1/0076* (2013.01); *H05B 33/0815* (2013.01); *H05B 33/0845* (2013.01)

(58) Field of Classification Search
CPC ... B60Q 1/00; B60Q 1/02; B60Q 1/04; B60Q 1/0011; B60Q 1/0047; B60Q 1/0076; B60Q 1/0082; B60Q 1/26; B60Q 1/46; B60Q 1/1461
USPC ..................... 315/77; 340/463, 465, 468, 475
See application file for complete search history.

(56) References Cited

U.S. PATENT DOCUMENTS

| | | | | |
|---|---|---|---|---|
| 4,227,174 A * | 10/1980 | Belcher | .................. | B60Q 1/385 340/321 |
| 4,994,786 A | 2/1991 | Schaffer | | |
| 5,355,119 A * | 10/1994 | Pearlman | ............. | B60Q 1/2611 340/331 |
| 5,414,407 A | 5/1995 | Gerrans | | |
| 5,614,884 A * | 3/1997 | Evans | ..................... | B60Q 1/343 200/61.27 |
| 5,731,755 A | 3/1998 | Boxer | | |
| 5,790,017 A | 8/1998 | Berryhill | | |
| 6,211,779 B1 * | 4/2001 | Gibb | .................... | B60Q 1/2611 340/464 |
| 7,167,086 B1 * | 1/2007 | Goins | ...................... | B60Q 1/50 340/463 |
| 7,199,704 B2 * | 4/2007 | Herrig | ...................... | B60Q 1/34 315/200 A |
| 8,519,840 B1 * | 8/2013 | Banks | ...................... | B60Q 1/34 340/465 |

(Continued)

FOREIGN PATENT DOCUMENTS

JP 11198719 7/1999

OTHER PUBLICATIONS

Houss, Max, PCT Patent Application No. PCT/US2016/014556 filed on Jan. 22, 2016, International Search Report mailed on Aug. 23, 2016, 14 pages.

*Primary Examiner* — Jason M Crawford
(74) *Attorney, Agent, or Firm* — Brian S. Steinberger; Law Offices of Brian S. Steinberger, P.A.

(57) ABSTRACT

Systems, devices, and methods for providing a switch adjacent to a vehicle turn signal lever to increase frequency rate of the on and off existing front turn lights and existing rear turn lights when the vehicle is attempting a U-turn. The increase can be approximately two to approximately three times the steady state blinking rate of the vehicle turn signal lights. The switch can be a button switch on the side or end of the existing turn signal lever. The invention does not require the use of extra lights to be installed on a vehicle for the U-turn.

17 Claims, 3 Drawing Sheets

(56) References Cited

U.S. PATENT DOCUMENTS

| | | | |
|---|---|---|---|
| 2002/0000912 A1* | 1/2002 | DeYoung | B60Q 1/46 340/471 |
| 2005/0083191 A1* | 4/2005 | Levin | B60Q 1/50 340/475 |
| 2005/0099286 A1* | 5/2005 | DeYoung | B60Q 1/46 340/463 |
| 2005/0168347 A1 | 8/2005 | Sanicola | |
| 2005/0179533 A1* | 8/2005 | Stevenson | B60Q 1/50 340/475 |
| 2005/0237174 A1 | 10/2005 | Hu | |
| 2007/0069881 A1 | 3/2007 | Dohan | |
| 2007/0184935 A1 | 8/2007 | Wallis | |
| 2009/0219150 A1* | 9/2009 | DeYoung | B60Q 1/46 340/471 |
| 2012/0078511 A1* | 3/2012 | Lim | G01C 21/3632 701/437 |
| 2014/0091920 A1* | 4/2014 | Thompson | B60Q 1/38 340/475 |
| 2015/0360603 A1* | 12/2015 | Miner | B60Q 1/44 340/479 |
| 2016/0144778 A1* | 5/2016 | Tucker | B60Q 1/52 340/471 |

\* cited by examiner

SIGNAL U-TURN

CROSS REFERENCE TO RELATED APPLICATION

This application claims the benefit of priority to U.S. Provisional Application Ser. No. 62/260,034 filed Nov. 25, 2015, the entire application which is incorporated by reference in its' entirety.

FIELD OF INVENTION

This invention relates to vehicles, and in particular to systems, devices, and methods for providing a switch adjacent to a vehicle turn signal lever or computer program control to increase frequency rate of the on and off front turn lights and rear turn lights when the vehicle is attempting a U-turn which indicates to oncoming and following vehicles.

BACKGROUND AND PRIOR ART

Existing turn signal controls typically are controlled by a steering column-mounted control stalk/lever arm mounted next to a steering wheel. The stalk/lever arm is generally moved to pivot upward (clockwise) and downward (counter-clockwise). The control stalk/lever arm generally actuates a set of mechanical switches inside the steering column and/or other types of circuits and/or vehicle computer controls so that upward (clockwise) movement causes a right turn signal switch to be activated and downward movement (counter-clockwise) causes a left turn signal switch to be activated. The lights can include factory installed turn signal lights on the front and back of the vehicle sometimes with the vehicle exterior break lights.

Generally, the turn signal control will remain in an upward or downward actuated position (thus, activating a respective set of exterior turn signal marker lights) until it is returned to the neutral, center or "off" position, which can occur after the vehicle has completed a turn or the driver mechanically moves the stalk back to the neutral initial position. U.S. Pat. No. 5,614,884 to Evans, which is incorporated by reference in it's' entirety shows and described prior art type turn signal controls, In operation, the driver wishing to make a left turn or right turn are mandated to give a signal and will generally engage the turn lever arms adjacent to steering wheels, which causes the front left and right turn lights and rear left and right tail lights to start a slow blinking process. However, there are problems that can occur if the driver wishes to make a full u-turn on the road.

Following vehicles at a traffic light stop or a vehicle in motion will sometimes start tailgating the vehicle in front trying to make the u-turn, since the following vehicle does not know that a u-turn is about to be done. This tailgating can cause the vehicle in front to be nervous and possibly attempt the u-turn faster which can be dangerous if there is oncoming traffic.

Additionally, the following driver may even run into the driver making the u-turn because they misjudge the forward vehicle's intentions, and wrongfully assume the forward driver is making a turn but not a u-turn.

Oncoming vehicles also may not understand the vehicle is making a u-turn. Thus the oncoming vehicle may assume a turn is being done which does not cause the oncoming vehicle to slow down, which can cause an accident to occur.

Attempts have been made over the years to try to create signaling devices for indicating a u-turn, but come with additional problems.

For example, U.S. Pat. No. 4,994,786 to Schaffer and U.S. Pat. No. 5,731,755 to Boxer, and U.S. Patent Application Publications: 2005/0168347 to Sanicola; 2005/0179533 to Stevenson; 2005/0237174 to Hu; 2007/0069881 to Dohan; 2014/0091920 to Thompson; and 2007/0184935 to Wallis, each describe devices that require mounting of extra lights to a vehicle such as lights configured in U or C shapes and/or different colors to indicate a U-turn. In addition to the extra expense of materials and labor, such devices could affect vehicle warranties, by needing to be permanently mounted. Extra lights and components can also interfere with existing signal lights and be prone to failure.

U.S. Patent Application Publication 2005/0083191 to Levin describes a button switch accessory to the current in use signal direction lever that causes turn lights to flash with extended delays between being lit and/or flash in continuous on-states. Such delays of the signal light flashing and extending the on-state of the signal lights can easily cause confusion to the following and coming vehicles, who may believe that the front vehicle is still making a turn. The long delays would not provide an extra indication to the following vehicle.

Thus, the need exists for solutions to the above problems with the prior art.

SUMMARY OF THE INVENTION

A primary objective of the present invention is to provide systems, devices, and methods for providing a separate switch or a computer program control to increase frequency rate of the on and off front turn lights and rear turn lights when the vehicle is attempting a U-turn.

A secondary objective of the present invention is to provide systems, devices, and methods for providing a user-activated switch or computer program control to use existing turn signal lights at a different flash rate speed that indicates to following and ongoing traffic that the vehicle is not making a basic left and right turn.

An embodiment of the u-turn light system for vehicles, can include or consist of a switch adjacent to an existing turn signal lever having an pre-set flashing rate frequency, and a flash rate increase control attached to the switch and existing turn signal lights on a vehicle, wherein activating the switch causes the existing turn signal lights to flash at an increased rate over a flashing rate of the existing turn signal lights.

The switch can include a mount for attaching the switch to a side of the turn signal lever. The switch can include a mount for attaching the switch to an end of the turn signal lever. The switch can be a depressible switch, slide switch, toggle switch, etc.

The flash rate increaser can include a circuit attached to the switch and controls for increasing flashing frequency of the existing turn signal lights.

The flash rate increaser can include software for increasing flashing frequency of the existing turn signal lights.

Activating the u-turn switch can cause a flash increase rate of at least approximately twice as fast as the flash rate of the existing turn signal lights.

Activating the u-turn switch can cause a flash increase rate of at least approximately three times as fast as the flash rate of the existing turn signal lights.

The pre-set flashing rate frequency can be between 60 and 120 blinks per minute, and the increased flashing rate frequency can be between 120 and 240 blinks per minute.

The pre-set flashing rate frequency can be between approximately 60 and approximately 120 blinks per minute, and the increased flashing rate frequency can be between approximately 120 and approximately 240 blinks per minute.

The pre-set flashing rate frequency can be between 1 and 2 Hz, and the increased flashing rate frequency is between 2 and 4 Hz.

The pre-set flashing rate frequency can be between approximately 1 and approximately 2 Hz, and the increased flashing rate frequency can be between approximately 2 and approximately 4 Hz.

A method of indicating a u-turn to oncoming and following vehicles, with existing turn signal lights on a vehicle, can include the steps of providing a separate switch adjacent to an existing turn signal lever inside of a vehicle, the existing turn signal lever controlling activation of the existing turn signal lights, and substantially increasing the flashing rate of the existing turn signal lights by activating the switch, wherein the method does not use additional lights on the vehicle other than the existing turn signal lights.

The step of increasing the flashing rate can include the step of increasing the flashing rate at least approximately twice the rate the existing turn signal lights flash on and off.

The step of increasing the flashing rate can include the step of increasing the flashing rate at least approximately three times the rate the existing turn signal lights flash on and off.

The method can include the steps of providing the existing turn signal lights to activate existing turn signals on the vehicle with a fixed flashing rate between 60 and 120 blinks per minute, and providing a flashing rate increase controller which when activated by the separate switch increases flashing rate to a fixed rate between 120 and 240 blinks per minute.

The method can include the steps of providing the existing turn signal lights to activate existing turn signals on the vehicle with a fixed flashing rate between approximately 60 and approximately 120 blinks per minute, and providing a flashing rate increase controller which when activated by the separate switch increases flashing rate to a fixed rate between approximately 120 and approximately 240 blinks per minute.

The method can include the steps of providing the existing turn signal lights to activate existing turn signals on the vehicle with a fixed flashing rate between 1 and 2 Hz, and providing a flashing rate increase controller which when activated by the separate switch increases flashing rate to a fixed rate between 1 and 2 Hz.

The method can include the steps of providing the existing turn signal lights to activate existing turn signals on the vehicle with a fixed flashing rate between approximately 1 and approximately 2 Hz and providing a flashing rate increase controller which when activated by the separate switch increases flashing rate to a fixed rate between approximately 1 and approximately 2 Hz.

Further objects and advantages of this invention will be apparent from the following detailed description of the presently preferred embodiments which are illustrated schematically in the accompanying drawings.

DESCRIPTION OF THE PREFERRED EMBODIMENTS

Figure 1:
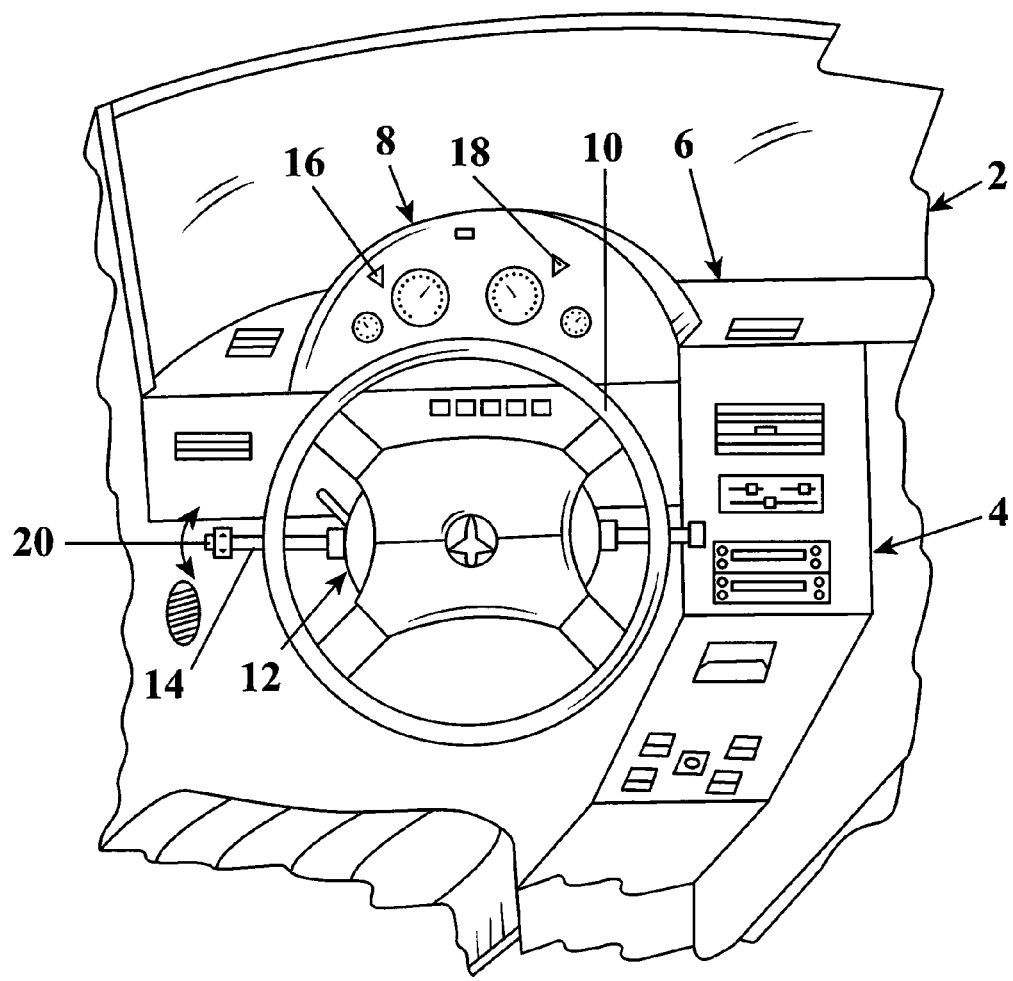
FIG. 1 shows a turn signal lever arm with depressible button switch to be activated by driver or by driverless vehicle before making a U-turn, installed in a vehicle.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation. In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
2 windshield
4 center console
6 dashboard
8 instrument panel
10 steering wheel
12 steering column
14 turn signal control lever arm (stalk) on steering wheel. Or by computer control by driverless car
16 left turn signal indicator
18 right turn signal indicator
20 U-turn switch for driver vehicles
100 Diagram of turn signal controls
110 Turn signal activator switches
112 Right turn switch
114 Left turn switch
120 Existing flasher relay/circuit or other existing control
132 Existing rear left turn light
134 Existing rear right turn light
136 Existing front left turn light
138 Existing front right turn light
140 New Flasher Relay or Flasher Control or program control The invention offers improvements on existing turn signal controls that can include an additional mechanical switch over the existing mechanical turn signals that can run on either or both circuitry and/or software, described in U.S. Pat. No. 5,614,884 to Evans, which is incorporated by reference in its' entirety.

Turn signals are required to blink on and off, or "flash", at a steady rate of between 60 and 120 blinks per minute (1-2 Hz) according to United Nations (UN) regulations.

FIG. 1 shows a turn signal lever arm 14 with separate switch 20 to be activated by driver before making a U-turn. The switch 20 can be a depressible button switch on the turn lever arm 14. In this embodiment, the novel turn signal switch 20 is shown attached to an end of a turn signal lever arm that is attached to a steering wheel column 12 which also supports a steering wheel 10. Alternatively, the U-turn switch can be located on the center console 4 or on the dashboard 6. As shown in FIG. 1, activating the turn signal lever 14 by pushing up or down as shown by the clockwise/counter-clockwise double arrow, can also light up an existing left turn signal light 16 or right turn signal light 18 on the instrument panel 8 below the windshield 2 inside of the motor vehicle.

Additionally, activating the U-turn switch 20 can light up either both the turn signal lights 16, 18 or one of the turn signal lights to indicate the intended turn direction of the vehicle.

Figure 2:
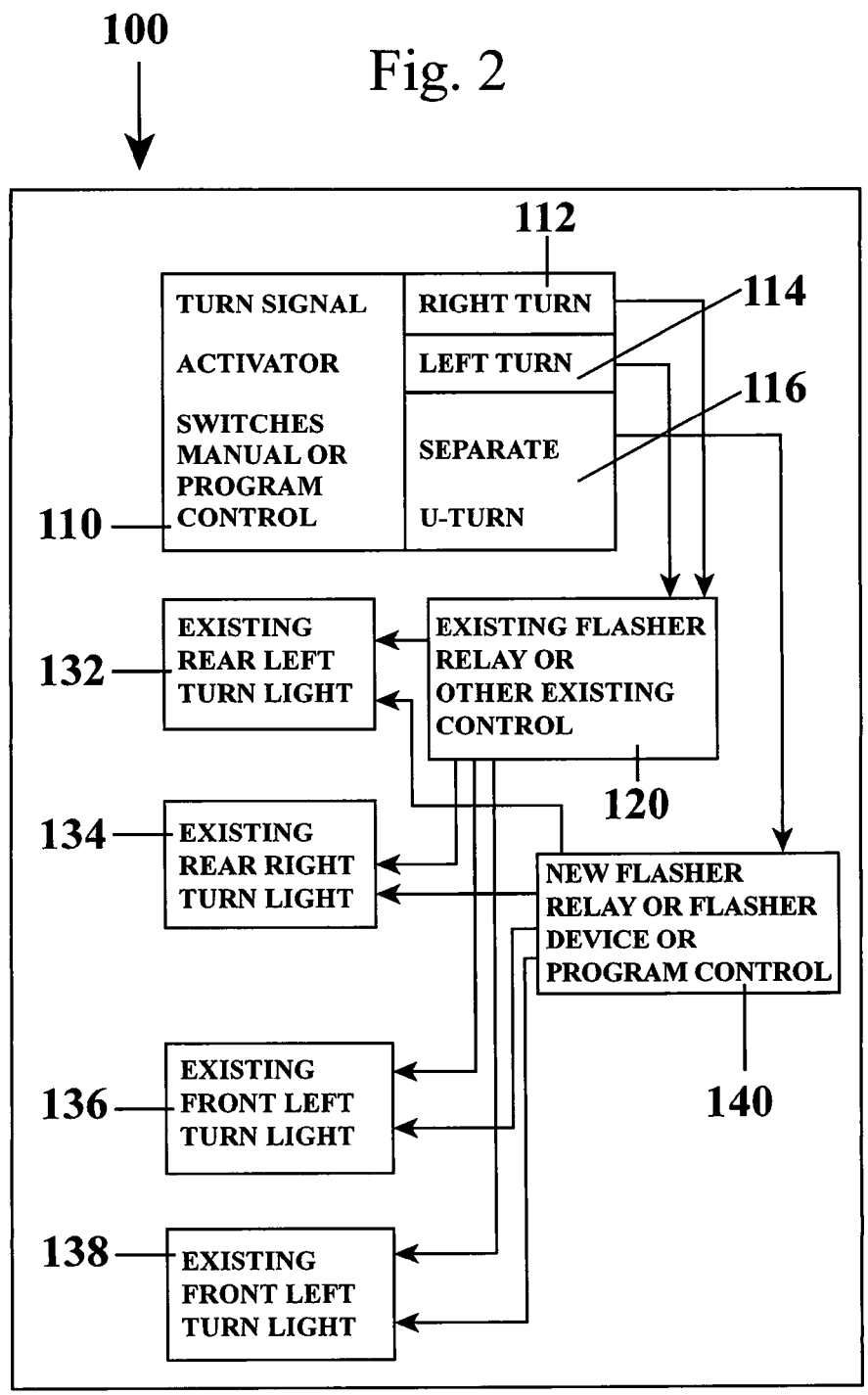
FIG. 2 shows a turn signal control diagram according to the invention.
Figure 3:
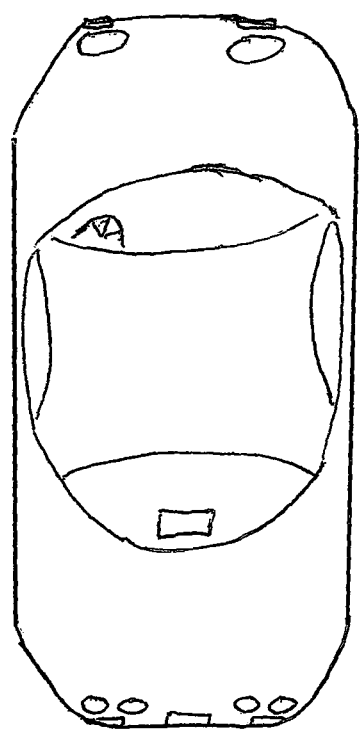
FIG. 3 shows a top view of an existing vehicle having front and rear lights and brake lights.

FIG. 2 shows a turn signal control diagram 100 according to the invention. Referring to both FIGS. 1 and 2, the driver can activate anyone of at least three switches 110, which can correspond to the switches on the turn signal lever arm 14. Here, pushing lever arm 14 upward can activate right turn light 18, right turn control 112 for existing flasher controls 120 in the vehicle to turn on existing front right turn light 132 and existing rear right turn light 134. When using the mechanical switch, the driver pushing lever arm 14 downward can activate left turn light 16 left turn control 114 for existing flasher controls 120 in the vehicle to turn on existing front left turn light 136 and existing rear left turn light 138.

The U-turn control can be computer activated in the case of driverless cars, without having to activate a mechanical switch.

Activating U-turn signal switch 20 activates control 116 for the new flasher increase rate control 140, which can either light up all turn lights 132, 134, 136, 138 with an increased flash rate or only the lights on the side of the vehicle in the direction of the vehicle turn.

Activating the switch 140 can cause the flashing signals from the existing front and rear turn lights to flash at a substantially faster rate than activating of the only the turn signal lights. For example, activating the switch 20 can cause the use of current state of the art LED (light emitting diodes) lamps signal lights to flash twice or three times as fast as just the activating of the turn signal lights.

The faster rate can be approximately 120 to approximately 240 to approximately 360 blinks per minute faster than the rate allowed by current UN regulations. If the vehicle rate of flashing is 60 per minute, the flashing for the U turn switch activation is at least approximately 120 per minute up to approximately 360 per minute. The increase will be a steady state minimum of at least two times the current steady state flashing rate in your vehicle signal turning light.

A faster flash rate would indicate to following vehicles and ongoing vehicles that the flashing vehicle is doing more than just a turn, and would cause those other vehicles to pay greater attention and caution to the vehicle with the fast flashing turn lights.

The invention would require minimal extra cost in materials and installation. The switch 20 can run by an extra flasher circuit, such as but not limited to a type of rheostat control and/or flasher relay, and the like, to increase the rate of flashing.

Alternatively, the vehicle computer can be programmed to allow for the extra flashing speed by being connected to the extra switch 20. Still furthermore, the invention can be a combination of a circuit and programming of the vehicle computer.

While the switch 20 is shown on the end of a vehicle turn lever 10, the switch can be on the side of the turn lever, or the base of the lever, or on the steering wheel, or any other location within each access of the driver. Although the switch can be a depressible button, the switch, can be a slide switch, or other type of switch, such as but not limited to a toggle switch, and the like. The switch can be spring biased to spring back after being depressed.

The invention does not require the mounting of additional lights and equipment that can cause undue material expense and labor for installation, as well as potentially void the vehicle's warranty. The invention can use only the existing front and rear turn signal lights.

The invention can have the other lights on the vehicle such as any one of the brake lights by themselves, and/or in combination with the head lights and rear lights to also flash (blink on and off) when the switch 20 is activated.

The invention can be factory installed by a vehicle manufacturer. Alternatively, the invention can be provided in an aftermarket kit to be installed by the vehicle owner or a knowledgeable vehicle repair person.

The invention can be used in driverless vehicles, where the vehicle computer can activate the U-turn control 110 shown in FIG. 2.

While the invention has been described for use on vehicles, such as motor vehicles, the invention can be used on other forms of transportation, such as but not limited to motorcycles, boats, golf carts, off terrain vehicles, and the like.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A u-turn light system for vehicles, consisting of:
   a switch adjacent to an existing turn signal lever, the existing turn signal lever for activating existing turn signal lights on a vehicle at a pre-set flashing rate frequency; and
   a flash rate increase control attached to the switch and to the existing turn signal lights on the vehicle, the flash rate increase control for solely increasing the pre-set flashing rate frequency of the existing turn signal lights, wherein activating the switch causes the existing turn signal lights to flash at an increased rate of at least twice as fast over the pre-set flashing rate frequency of the existing turn signal lights.

2. The u-turn light system of claim 1, wherein the switch includes:
   a mount for attaching the switch to a side of the turn signal lever.

3. The u-turn light system of claim 1, wherein the switch includes:

a mount for attaching the switch to an end of the turn signal lever.

4. The u-turn light system of claim 1, wherein the switch includes:
a depressible button switch.

5. The u-turn light system of claim 1, wherein the flash rate increase control includes:
a circuit attached to the switch and controls for increasing flashing frequency of the existing turn signal lights.

6. The u-turn light system of claim 1, wherein the flash rate increase control includes:
software for increasing flashing frequency of the existing turn signal lights.

7. The u-turn light system of claim 1, wherein the flash rate increase control includes:
a flash increase rate of at least three times as fast as the flash rate of the existing turn signal lights.

8. The u-turn light system of claim 1, wherein the pre-set flashing rate frequency is between 60 and 120 blinks per minute, and the increased rate is between 120 and 240 blinks per minute.

9. The u-turn light system of claim 1, wherein the pre-set flashing rate frequency is between approximately 60 and approximately 120 blinks per minute, and the increased rate is between approximately 120 and approximately 240 blinks per minute.

10. The u-turn light system of claim 1, wherein the pre-set flashing rate frequency is between 1 and 2 Hz, and the increased rate is between 2 and 4 Hz.

11. The u-turn light system of claim 1, wherein the pre-set flashing rate frequency is between approximately 1 and approximately 2 Hz, and the increased rate is between approximately 2 and approximately 4 Hz.

12. A method of indicating a u-turn to oncoming and following vehicles, with existing turn signal lights on a vehicle, consisting of the steps of:
providing a separate switch adjacent to an existing turn signal lever inside of a vehicle, the existing turn signal lever for activating the existing turn signal lights at a pre-set flashing rate;
providing a flash rate control for solely increasing the flash rate frequency of the existing turn signal lights to flash at an increased frequency rate of at least twice as fast over the pre-set flashing rate, the flash rate control being activated by the separate switch; and
increasing the flashing rate of the existing turn signals by solely activating the separate switch so that the existing turn signal lights flash at an increased rate of at least twice as fast over the pre-set flashing rate, wherein the method does not use additional lights on the vehicle other than the existing turn signal lights.

13. The method of claim 12,
wherein the step of providing a flash rate control for solely increasing the flashing rate includes the step of:
increasing the flashing rate at least three times the rate the existing turn signal lights flash on and off.

14. The method of claim 12,
wherein the step of providing the flashing rate increase controller includes the steps of:
providing the existing turn signal lights to activate existing turn signals on the vehicle with a fixed flashing rate between 60 and 120 blinks per minute; and
providing a flashing rate increase controller which when activated by the separate switch increases flashing rate to a fixed rate between 120 and 240 blinks per minute.

15. The method of claim 12,
wherein the step of providing the flashing rate increase controller includes the steps of:
providing the existing turn signal lights to activate existing turn signals on the vehicle with a fixed flashing rate between approximately 60 and approximately 120 blinks per minute; and
providing a flashing rate increase controller which when activated by the separate switch increases flashing rate to a fixed rate between approximately 120 and approximately 240 blinks per minute.

16. The method of claim 12, wherein the step of providing the flashing rate increase controller includes:
providing the existing turn signal lights to activate existing turn signals on the vehicle with a fixed flashing rate between 1 and 2 Hz; and
providing a flashing rate increase controller which when activated by the separate switch increases flashing rate to a fixed rate between 2 and 4 Hz.

17. The method of claim 12, wherein the step of providing the flashing rate increase controller includes:
providing the existing turn signal lights to activate existing turn signals on the vehicle with a fixed flashing rate between approximately 1 and approximately 2 Hz; and
providing a flashing rate increase controller which when activated by the separate switch increases flashing rate to a fixed rate between approximately 2 and approximately 4 Hz.

* * * * *